May 30, 1944.　　　　E. HERING　　　　2,350,231

JOINT FOR CONCRETE PIPES

Filed Aug. 4, 1941

WITNESS
F. J. Hartman.

INVENTOR
Edward Hering.
BY John D. Myers
ATTORNEY

Patented May 30, 1944

2,350,231

UNITED STATES PATENT OFFICE 2,350,231

JOINT FOR CONCRETE PIPE

Edward Hering, Beverly, N. J., assignor to United States Pipe and Foundry Company, a corporation of New Jersey Application August 4, 1941, Serial No. 405,322

2 Claims. (Cl. 285—112)

The invention relates to a joint for concrete pipe and is directed specifically to a bell and spigot joint which is sealed with lead or other fusible packing material poured from the outside of the pipe when the sections are assembled and which requires no calking in order to render it tight initially or after continued use.

Heretofore in using lead for packing the adjoining ends of concrete pipe, it has generally been regarded necessary to calk the lead from the inside of the pipe after the sections have been assembled. Such procedure can be carried out only when the pipe is of such diameter as to permit a calker to operate from the inside of the pipe, and such an operation also requires that ample space be provided at the joint, on the inside of the pipe, to permit suitable calking tools to be used. Such a joint is usually completed by filling the calking space with cement.

With joints calked from the inside of the pipe in this manner, variations in the original alinement of adjoining pipe sections caused by expansion and contraction, by settling, or by surface loads, often cause the joints to open up, and this opening up is frequently sufficient to break away pieces of the cement used for filling the calking opening on the inside of the pipe. Any such relative movement of adjoining sections of the pipe also tends to loosen the lead packing and thereby produce a leaky joint. In other cases, relative movement of adjoining sections may be only sufficient to loosen the cement filler, the lead alone then serving to seal the joint. As is well known, lead alone will not withstand relative movement of adjoining sections for any considerable time without becoming sufficiently loose to produce a leak, particularly where the pipe is subjected to considerable internal pressure, as in a water system.

One of the principal objects of the present invention is the provision of a concrete pipe joint which is of such a construction that the lead or other sealing material employed therein may be poured from the outside of the pipe. Another object of the invention is the provision of a leaded concrete pipe joint which requires no calking. Another object of the invention is a concrete pipe joint which is entirely closed upon completion of the pouring of the lead or other sealing material from the outside of the pipe. The invention has for another object the utilization of a sealing gasket which not only serves as a dam for the inflowing molten packing material but also as a permanent seal between opposing portions of the adjoining pipe sections. A further object of the invention is the provision of an externally poured joint which is maintained tight by the internal pressure in the pipe. A still further object of the invention is an externally poured pipe joint which will withstand a considerable degree of longitudinal pull. It is also an object of the invention to provide a concrete pipe joint which is ready for use immediately upon completion of the pouring of the lead or other packing material. Still further objects and advantages of the improvement will be apparent from the following specification, taken with the accompanying drawing wherein:

Figure 1:
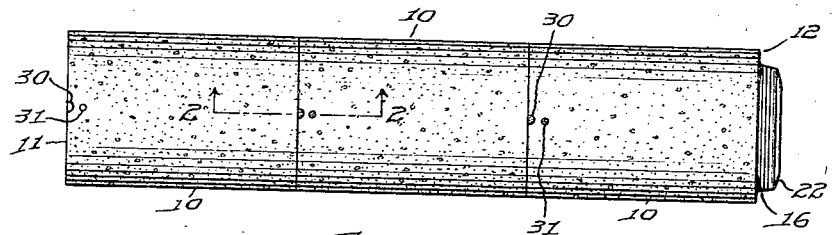
Fig. 1 is a top plan view of connected sections of concrete pipe having joints with the present improvement incorporated therein.

While the invention may be employed for the purpose of connecting sections of concrete pipe of other constructions, as disclosed herein the improvement is applied to sections of pipe 10 having a bell portion 11 at one end and a spigot portion 12 at the opposite end, the conformation of the bell and spigot being such that, when sections are assembled, the spigot on one section fits within the bell of an adjoining section in a manner well known in the art. The sections 10 are preferably reinforced by longitudinal reinforcing rods 13 and by reinforcing rings 14 embedded in the concrete wall in a well known manner. Each section of the pipe is also provided with a metallic reinforcement 15 of tubular formation extending throughout the length of the section substantially intermediate the inner and outer surfaces of the concrete wall.

At the spigot end of the section the tubular reinforcement 15 tapers inwardly as shown at 16 to form the peripheral face of a reduced extension 17 which constitutes the spigot. The tapered end 16 is preferably formed with annular corrugations therein to provide in its outer surface retaining grooves 18 for the poured lead or other packing material 19. The reduced extension 17 may be further reinforced by means of a steel ring 20 welded to the inside of the tapered end 16 and embedded in the concrete wall. The shoulder 21 formed at the base of the reduced extension 17 is preferably arranged substantially at right angles to the center line of the pipe section, although other formations may be used. The extreme outer end of the reduced extension is preferably beveled to a slight extent as shown at 22.

The bell portion 11 is formed by a peripheral extension 23 the inner face of which is covered by the end 24 of the tubular reinforcement 15. Like the opposite end of the tubular reinforcement, the end 24 is corrugated to form internal grooves 25 which cooperate with the grooves 18 on the spigot end of an adjoining section of pipe to retain the poured packing material 19 in position. The bell end may also be reinforced by a steel ring 26 positioned between the corrugated portion 24 and the surrounding concrete and welded to the tubular reinforcement 15.

The length of the peripheral extension 23 is somewhat greater than the length of the reduced extension 17 so that when two sections of pipe are assembled the outer end of the spigot, that is, the beveled end 22, is substantially spaced from the bottom wall 27 of the bell when the face 28 of the outer end of the peripheral extension is in abutting contact with the annular shoulder 21 of the adjoining spigot end. The face 28 preferably conforms to the shoulder 21 and is arranged substantially at right angles to the center line of the section 10. Preferably the bottom wall 27 is beveled inwardly from the tubular reinforcement in a manner similar to, but in a direction opposite to, the bevel 22 on the end of the spigot. The inner diameter of the bell 11 is somewhat greater than the outer diameter of the spigot 12 so that the opposing grooved ends of the overlapping extensions 17 and 23 are spaced concentrically to form an annular packing chamber of substantial thickness for the packing material 19. It will also be apparent from the construction described that a substantial packing space is provided between the outer end 22 of the reduced extension and the bottom wall 27 of the bell, and that the width of this space increases from the inner surface of the pipe outwardly.

Figure 2:
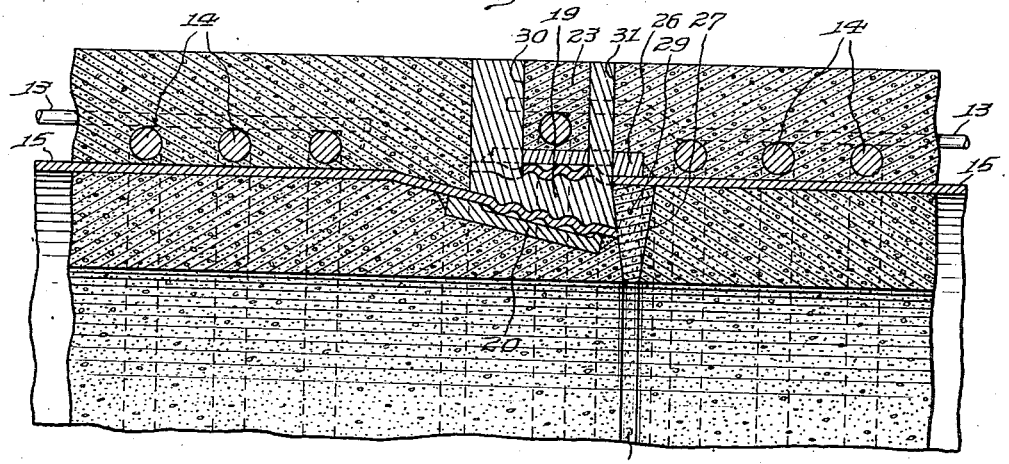
Fig. 2 is an enlarged longitudinal sectional view taken on the line 2—2 of Fig. 1, and showing the details of one of the joints of the pipe illustrated therein.
Figure 3:
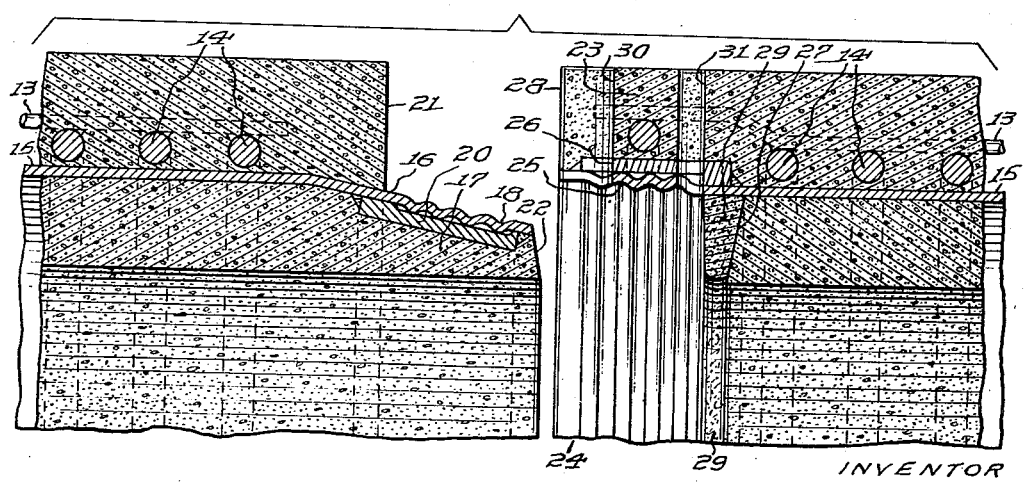
Fig. 3 is a longitudinal sectional view similar to Fig. 2, but showing the pipe sections before they are assembled.

In assembling the bell end of one section of pipe and the spigot end of another section, a packing ring 29, preferably made of asbestos fiber, hemp, jute or the like, and having a cross-sectional shape approximating that shown in Fig. 3 of the drawing, is inserted in the bell in contact with the bottom wall 27. When the ends of two adjoining sections of pipe are brought together with the reduced extension 17 in place in the bell, the packing ring 29 is compressed between the beveled end 22 and the bottom wall of the bell as shown in Fig. 2. In this position of the assembled parts the fibrous packing ring 29 not only serves as a dam for the molten lead or other packing material 19 which is poured into the space between the overlapping extensions 17 and 23, but it remains in place as a permanent seal for the joint. The inwardly decreasing width of the space between the end 22 and the bottom of the bell assists in maintaining the packing ring 29 in place permanently.

The pouring gate for the molten packing material 19 is preferably in the form of a radial notch 30 in the outer end of the peripheral extension 23, this notch being formed not only in the concrete portion of the extension but also in the end 24 of the tubular reinforcement 15 and in the reinforcing ring 26. A radial vent 31 is provided in the inner end of the peripheral extension 23, this opening also extending through the end 24 of the tubular reinforcement and through the reinforcing ring 26. The vent 31 is preferably positioned outwardly of the packing ring 29 so that the ring will not interfere with the venting operation when the molten packing material is poured through the gate into the packing space. This location of the pouring gate 30 and the vent 31 with respect to the space for the sealing material 19 assures that this space will be completely filled, and that all the dross in the molten material will be discharged through the vent when the molten material completely fills the packing space between the extensions 17 and 23, and between the packing ring 29 and the shoulder 21. Both the pouring gate 30 and the vent 31 are completely filled with the poured packing material.

As will be apparent from the disclosure herein, the improvement provides a joint in which the molten packing material is poured from the outside of the pipe and no calking operation is required in order to complete it. It will also be apparent that only a small part of the joint is exposed on the inside of the pipe, the exposed part being the inner edge of gasket or packing ring 29. Inasmuch as the inner portion of this gasket is under compression when the adjoining ends of two sections of pipe are assembled, the tendency of the gasket to expand operates to provide a tight joint notwithstanding such relative movements of two connected sections as ordinarily take place after the pipe has been laid. This construction also provides a joint wherein the pressure on the packing ring 29, from within the pipe, operates upon both the packing ring and the packing material 19 to maintain a tight joint notwithstanding any tendency of the joint to open up when in use. As will also be apparent, the joint requires no inside filling of cement or other material which is likely to crack, loosen or break away upon movement of one section of the pipe relatively to another. Furthermore, the construction provides a joint which is completely made from the outside of the pipe, and is ready to be put into service as soon as the molten packing material is poured and given sufficient time to harden.

While a preferred construction of the joint has been disclosed herein, together with a certain arrangement of the various parts thereof, it is to be understood that the invention is not intended to be limited to the precise form and arrangement of parts disclosed. The above description and the accompanying drawing are therefore to be regarded as illustrative only, and it is to be understood that the invention is susceptible of other forms and arrangements so long as they come within the scope of the appended claims.

What I desire to claim is:

1. In a bell and spigot joint for sections of concrete pipe in which the spigot end is formed by a reduced extension and the bell end is formed by a peripheral extension of greater length than said reduced extension and having throughout its length an inside diameter greater than the outside diameter of said reduced extension to provide a packing space between said extensions and between the end of said reduced extension and the bottom wall of said bell, the improvement which comprises a resilient sealing gasket covering the bottom wall of said bell and compressed between said wall and the end of said reduced extension, and a poured, fusible packing material filling the space between the overlapping portions of said extensions.

2. A concrete pipe joint as specified in claim 1, in which the packing space between the end of the reduced extension and the bottom wall of the bell increases in width from the inner surface of the pipe outwardly.

EDWARD HERING.